United States Patent
Fukumoto

(10) Patent No.: US 12,330,579 B2
(45) Date of Patent: Jun. 17, 2025

(54) AIRBAG DEVICE AND GAS GENERATOR

(71) Applicant: Daicel Corporation, Osaka (JP)

(72) Inventor: Kenji Fukumoto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 0 days.

(21) Appl. No.: 18/585,235

(22) Filed: Feb. 23, 2024

(65) Prior Publication Data

US 2024/0190377 A1 Jun. 13, 2024

Related U.S. Application Data

(63) Continuation of application No. PCT/JP2022/016579, filed on Mar. 31, 2022.

(30) Foreign Application Priority Data

Aug. 23, 2021 (JP) .................. 2021-135929

(51) Int. Cl.
*B60R 21/217* (2011.01)
*B60R 21/239* (2006.01)
(Continued)

(52) U.S. Cl.
CPC .......... *B60R 21/217* (2013.01); *B60R 21/239* (2013.01); *B60R 21/2644* (2013.01);
(Continued)

(58) Field of Classification Search
CPC ...... B60R 21/217; B60R 21/239; B60R 21/26
See application file for complete search history.

(56) References Cited

U.S. PATENT DOCUMENTS

| 4,021,058 A | 5/1977 | Suzuki et al. |
| 2007/0228013 A1 | 10/2007 | Stevens et al. |

FOREIGN PATENT DOCUMENTS

| JP | S5151838 A | 5/1976 |
| JP | H08156737 A | 6/1996 |

(Continued)

OTHER PUBLICATIONS

International Search Report of PCT/JP2022/016579 mailed May 24, 2022, 5 pages (with English Translation).

(Continued)

*Primary Examiner* — Karen Beck
(74) *Attorney, Agent, or Firm* — XSENSUS LLP

(57) ABSTRACT

An airbag device includes a gas generator including an ignition device, a gas generating agent and a housing and provided with a gas discharge port, a shielding member covering an outside of the housing and moving to a shielding position located in a discharge direction of a combustion gas from the gas discharge port and a non-shielding position not located in the discharge direction of the combustion gas from the gas discharge port, an elastic member disposed between the housing and the shielding member and configured to energize the shielding member to position the shielding member at the shielding position or the non-shielding position in accordance with a magnitude of an external force received by the shielding member, and an airbag bag body disposed in communication with the inside of the housing through the gas discharge port of the gas generator, and accommodating the shielding member and the elastic member.

17 Claims, 13 Drawing Sheets

(51) Int. Cl.
*B60R 21/26* (2011.01)
*B60R 21/264* (2006.01)

(52) U.S. Cl.
CPC .............. *B60R 2021/26011* (2013.01); *B60R 2021/26029* (2013.01)

(56) References Cited

FOREIGN PATENT DOCUMENTS

| | | | |
|---|---|---|---|
| JP | 2008238841 A | 10/2008 | |
| JP | 2017074850 A | 4/2017 | |
| WO | WO-0056580 A1 * | 9/2000 | ......... B60R 21/2338 |

OTHER PUBLICATIONS

Written Opinion of the International Searching Authority of PCT/JP2022/016579 mailed May 24, 2022, 5 pages (with English Translation).

* cited by examiner

AIRBAG DEVICE AND GAS GENERATOR

TECHNICAL FIELD

The present invention relates to an airbag device.

BACKGROUND ART

A proposed airbag device includes a gas generator, a module case in which an airbag is stored, and a control circuit (e.g., Patent Document 1). The gas generator has a plurality of gas outlets with different opening areas. The module case has coolants movable in the circumferential direction. The positions of the gas outlets and the coolants are adjusted by the instruction of the control circuit, and the temperature of the gas flowing into the airbag is controlled.

CITATION LIST

Patent Document

Patent Document 1: JP 2008-238841 A

SUMMARY OF INVENTION

Technical Problem

When the positional relationship between a gas outlet and a coolant is adjusted using a control circuit, the complicated configuration makes it difficult to downsize.

An object of the technology of the present disclosure is to make it possible to adjust an internal pressure of an airbag with a simple configuration.

Solution to Problem

An airbag device includes: a gas generator including an ignition device, a gas generating agent ignited by the ignition device and generating a combustion gas, and a housing accommodating the ignition device and the gas generating agent and provided with a gas discharge port; a shielding member covering an outside of the housing and capable of moving to a shielding position located in a discharge direction of the combustion gas from the gas discharge port and a non-shielding position not located in the discharge direction of the gas from the gas discharge port; an elastic member disposed between the housing and the shielding member and configured to energize the shielding member to position the shielding member at the shielding position or the non-shielding position in accordance with a magnitude of an external force received by the shielding member; and an airbag bag body disposed in communication with the inside of the housing through the gas discharge port of the gas generator, and accommodating the shielding member and the elastic member.

The shielding member can move to the shielding position located in the discharge direction of the combustion gas from the gas discharge port and to the non-shielding position not located in the discharge direction of the gas from the gas discharge port, and thus the shielding member can lower the temperature of the combustion gas at the shielding position. The elastic member moves the shielding member to the shielding position or the non-shielding position in accordance with the magnitude of the external force received by the shielding member, and thus the shielding member can be moved to the shielding position by the internal pressure of the airbag. Thus, when the internal pressure of the airbag exceeds a predetermined standard, the shielding member is moved to the shielding position to lower the temperature of the combustion gas. Lowering the temperature of the combustion gas can suppress an excessive rise in the internal pressure of the airbag. That is, the internal pressure of the airbag can be adjusted with a simple configuration.

The elastic member may extend in a state where the shielding member does not receive an external force and position the shielding member at the non-shielding position. The elastic member may be, for example, a coil spring or a leaf spring.

The housing may have an upper surface, a bottom surface, and a side surface connecting the upper surface and the bottom surface and provided with a plurality of gas discharge ports. The shielding member may have an upper part covering the upper surface of the housing and a peripheral wall part extending in a periphery of the side surface from a peripheral edge of the upper part toward the bottom surface, and the shielding member may block a discharge direction of the combustion gas from at least some of the gas discharge ports at the shielding position.

The side surface of the shielding member may include a filter. This improves cooling efficiency of the combustion gas.

The plurality of gas discharge ports includes a first gas discharge port provided on a side near the upper surface on the side surface and a second gas discharge port provided on a side near the bottom surface relative to the first gas discharge port on the side surface, and the shielding member may face the first gas discharge port at the shielding position and may not face the first gas discharge port at the non-shielding position.

Each of the plurality of gas discharge ports may be closed by a closing member, and the pressure required to rupture the closing member closing the first gas discharge port may be higher than the pressure required to rupture the closing member closing the second gas discharge port.

The upper surface of the shielding member may have a flat plate shape without a hole. When the upper surface of the gas generator is provided with the gas discharge port, the combustion gas discharged from the gas discharge port collides with the shielding member regardless of the shielding position or the non-shielding position and then pushes up the shielding member. When the gas discharge port is provided at the side surface and not provided at the upper surface, in the configuration in which a shielding member having a bottomed tubular shape covers the upper part of an upper shell, change in the position of the shielding member in accordance with the internal pressure of an airbag bag body can be easily controlled.

The upper surface of the shielding member may have a shape similar to that of the upper surface of the gas generator. In this manner, in the configuration in which the shielding member is overlapped on the gas generator, the entire airbag can be made compact. In plan view, the shielding member may have a circular shape larger than the gas generator, and the shielding member or the gas generator may include a spacer portion forming a gap between the shielding member and the gas generator. In this manner, the shielding member can move between the shielding position and the non-shielding position while appropriately maintaining the gap with the gas generator.

A guide portion that sandwiches the shielding member between the guide portion and the gas generator, guides the moving direction of the shielding member, and regulates the moving range of the shielding member may be further included.

The guide portion may be a perforated member provided between the shielding member and the airbag bag body and having a plurality of holes through which the combustion gas can pass.

A base plate connected to the gas generator and the airbag bag body may be further provided, and at least one of the airbag bag body or the base plate may have an openable and closable variable vent that discharges a part of the combustion gas when the internal pressure of the airbag bag body exceeds a predetermined threshold. This also makes it possible to suppress an excessive rise in the internal pressure of the airbag. That is, the internal pressure of the airbag can be adjusted with a simple configuration.

The content described in Solution to Problem can be combined as much as possible without departing from the problems and technical ideas of the present disclosure.

Advantageous Effects of Invention

According to the present disclosure, the internal pressure of the airbag can be adjusted with a simple configuration.

DESCRIPTION OF EMBODIMENTS

Embodiments according to the present disclosure will be described below with reference to the accompanying drawings. It should be noted that the respective configurations and the combinations thereof in the respective embodiments are merely examples, and additions, omissions, substitutions, and other changes to the configurations can be made as appropriate without departing from the gist of the present invention. The present disclosure is not limited by the embodiment and is limited only by the claims.

First Embodiment

Figure 1:
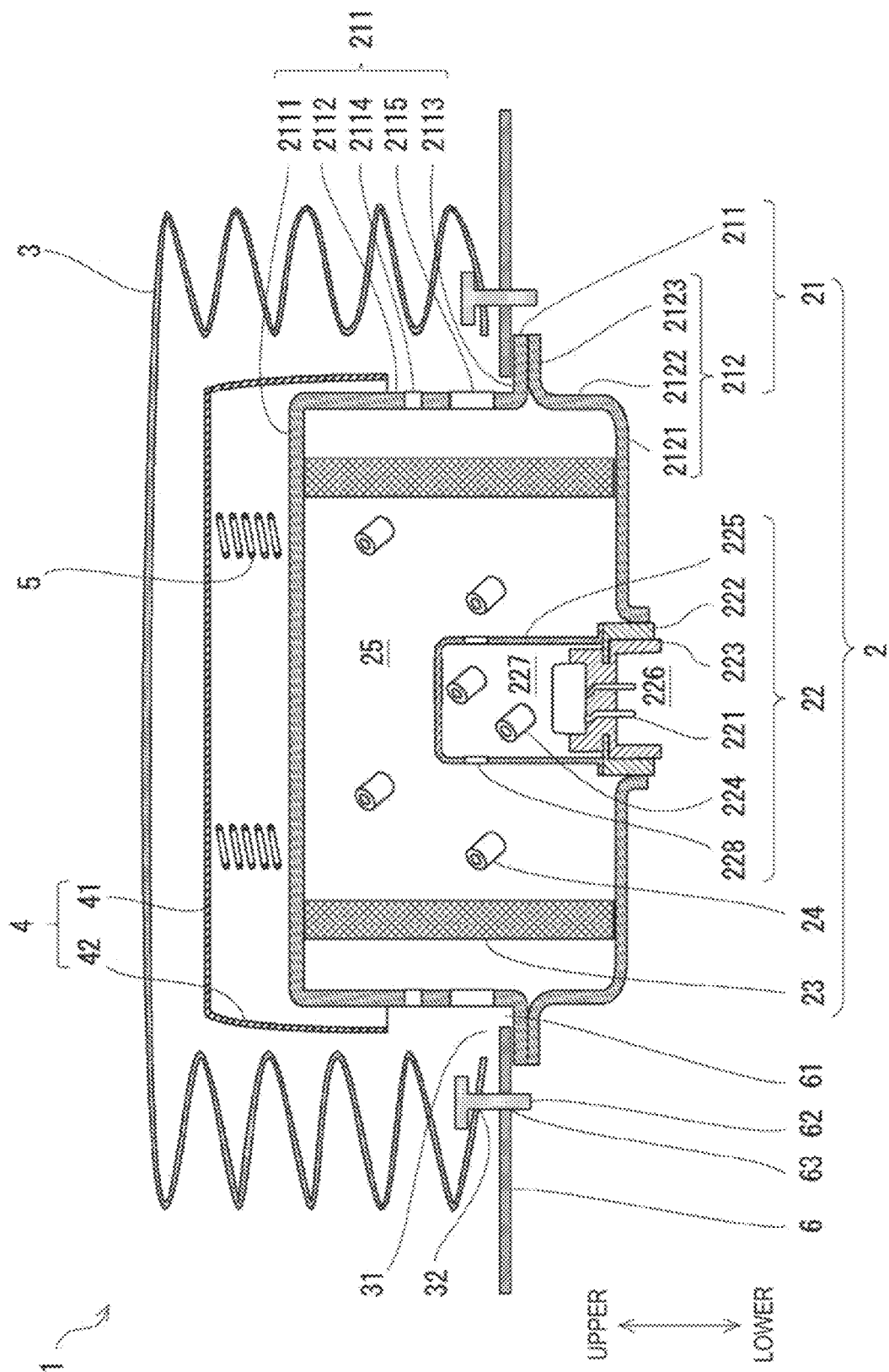
FIG. 1 is a schematic cross-sectional view in an axial direction illustrating an example of an airbag according to a first embodiment.

FIG. 1 is a schematic cross-sectional view in an axial direction illustrating an example of an airbag according to the present embodiment. An airbag 1 is incorporated in a steering wheel or a dashboard of an automobile, for example. The airbag 1 of FIG. 1 includes a gas generator 2, an airbag bag body 3, a shielding member 4, an elastic member 5, and a base plate 6, and the gas generator 2 and the airbag bag body 3 are connected to the base plate 6. For convenience, the direction in which the airbag bag body 3 inflates with respect to the gas generator 2 is described as the upper side, as indicating the vertical direction by the arrow in FIG. 1.

Gas Generator

The gas generator 2 is ignited by a current supplied from the outside, and burns a gas generating agent included inside the gas generator 2 and discharges a combustion gas. The gas generator 2 illustrated in FIG. 1 is a single type device including one igniter 22, but the present invention is not limited to such an example, and an existing gas generator such as a so-called dual type device can be used.

The gas generator 2 of FIG. 1 includes a housing 21, the igniter 22, a filter 23, and a first gas generating agent 24. By operating an igniter main body 221 disposed in the housing 21, the gas generator 2 burns the first gas generating agent 24 filled inside the housing 21 and discharges the combustion gas.

The housing 21 is formed in a short tubular shape in which both ends in the axial direction are closed by joining the upper shell 211 and a lower shell 212 made of metal each formed in a bottomed tubular shape in a state where the open ends thereof face each other. However, the configuration of the upper shell 211 and the lower shell 212 is not limited to this, and a known configuration can be appropriately used.

The upper shell 211 includes an upper tube part 2112 having a tubular shape, a top plate part 2111 closing an upper end of the upper tube part 2112, and a joint part 2113 having a flange shape extending radially outward from a lower end part of the upper tube part 2112. The lower shell 212 includes a lower tube part 2122 having a tubular shape, a bottom plate part 2121 closing a lower end of the lower tube part 2122, and a joint part 2123 having a flange shape extending radially outward from an upper end part of the lower tube part 2122. The joint part 2113 of the upper shell 211 and the joint part 2123 of the lower shell 212 are overlapped and joined by welding or the like, thereby forming the housing 21. The upper shell 211 is inserted into a holding hole 61 provided in the base plate 6, and the joint part 2113 or the joint part 2123 and a peripheral edge part of the holding hole 61 of the base plate 6 are welded, for example. Note that the holding hole 61 provided at the base plate 6 is an opening having a diameter larger than the outer diameter of the upper tube part 2112 and smaller than the diameter of the joint part 2113.

In the upper tube part 2112 of the upper shell 211, a plurality of first gas discharge ports 2114 and a plurality of second gas discharge ports 2115 communicating the inside and the outside of the housing 21 are formed side by side along the circumferential direction. As illustrated in FIG. 1, the first gas discharge ports 2114 are provided above the second gas discharge ports 2115. In the example of FIG. 1, the opening area per one first gas discharge port 2114 is smaller than the opening area per one second gas discharge port 2115, but the present invention is not limited to such an example. Before the operation of the gas generator 2, the first gas discharge ports 2114 and the second gas discharge ports 2115 are closed by a closing member (not illustrated) such as a seal tape. The seal tape is a member having impermeability with a thickness of, for example, about 50 μm to 100 μm. Note that gas discharge ports may be provided at different positions of three or more different levels in the vertical direction. The top plate part 2111 may also be provided with a gas discharge port.

The igniter 22 is connected to the lower shell 212 of the housing 21. The igniter 22 includes the igniter main body 221 that ignites by an ignition current, an igniter holding portion 222 supporting the igniter main body 221, a fixing portion 223 interposed between the igniter main body 221 and the igniter holding portion 222, a second gas generating agent 224 that ignites by a combustion product of the igniter main body 221, and a case 225 accommodating the second gas generating agent 224 and the like.

The igniter main body 221 includes a metal cup body accommodating an ignition charge and sealed, and a pair of electro-conductive pins for receiving supply of a current from the outside. By operating by the ignition current supplied to the pair of electro-conductive pins, the igniter main body 221 burns the ignition charge in the cup body, and releases the combustion product to the outside of the cup body.

The igniter holding portion 222 is a metal collar supporting the side of the igniter main body 221, for example. That is, the igniter holding portion 222 is a metal member formed in a tubular shape. The igniter holding portion 222 holds the igniter main body 221 inside thereof. Note that, to suppress a circumferential rotation of the igniter main body 221 and the fixing portion 223, recesses and protrusions may be provided on the inner peripheral surface of the igniter holding portion 222 being in contact with the fixing portion 223, and the shape of the hole through which the electro-conductive pins pass may have an inner peripheral surface having a shape other than a perfect circle such as a polygon or an ellipse in cross-sectional view. The igniter holding portion 222 may be fixed to the housing 21 of the gas generator 2, for example, by welding or the like. Note that the igniter holding portion 222 may be formed integrally with the bottom plate part 2121. That is, the igniter holding portion 222 made of metal may be formed with a part of the lower shell 212 of the housing 21. In this case, the igniter holding portion 222 is provided and protrudes upward into the inside of the housing 21 from the bottom plate part 2121.

The fixing portion 223 is a resin member interposed by injection molding between the igniter main body 221 and the igniter holding portion 222 and fixing the igniter main body 221 to the igniter holding portion 222. The fixing portion 223 covers the periphery of the side of the igniter main body 221, and at least a part of the cup body is exposed from the fixing portion 223. The fixing portion 223 is engaged with the inside of the igniter holding portion 222, thereby fixing the igniter main body 221 to the igniter holding portion 222. However, the entire cup body may be overmolded by the fixing portion 223. That is, the entire cup body may be in a state of being covered with the resin. The fixing portion 223 may form, inside the igniter holding portion 222, a connector insertion space 226 into which a connector (not illustrated) for supplying power from an external power supply to the pair of electro-conductive pins can be inserted. The fixing portion 223 covers and holds a part of the pair of electro-conductive pins, and lower ends of the pair of electro-conductive pins are exposed to the connector insertion space 226. Then, the fixing portion 223 keeps insulation between the pair of electro-conductive pins. Note that various known techniques can be used for fixation of the igniter main body 221 and the igniter holding portion 222 and a connection relationship between the igniter holding portion 222 and the housing. As a material of the fixing portion 223, a resin material having excellent heat resistance, durability, corrosion resistance, and the like after curing can be suitably used.

The case 225 is a bottomed tubular member extending upward from the igniter holding portion 222 and surrounds the upper part of the igniter 22. That is, the case 225 is formed in a tubular shape in which one end (upper end) is closed and the other end (lower end) is opened. The other end of the case 225 may be formed in a flange shape and connected to the igniter holding portion 222 by full circumference welding, for example. A combustion chamber 227, which is an internal space accommodating the second gas generating agent 224, is formed between the case 225 and the igniter holding portion 222. The second gas generating agent 224 is combusted by the operation of the igniter main body 221 to generate combustion gas and the like. A side surface of the case 225 is provided with a plurality of communication holes 228 for communicating the combustion chamber 227 with an external space. The communication holes 228 are closed by a closing member (not illustrated) such as a seal tape in a state before the igniter 22 operates. When the igniter 22 is operated, the seal tape is ruptured by the pressure of the combustion gas, and the combustion gas is discharged from the communication holes 228 to the outside of the combustion chamber 227. The communication holes 228 may be formed not on a side surface but on a top surface of the case 225.

The first gas generating agent 24 and the second gas generating agent 224 may be gas generating agents having the same type, shape, dimension, and the like, or may be gas generating agents in which at least a part thereof is different. The first gas generating agent 24 and the second gas generating agent 224 generate a combustion product such as a combustion gas by combustion. The individual shapes of the first gas generating agent 24 and the second gas generating agent 224 may be, for example, a single-hole columnar shape, but the shapes are not limited to this.

The filter 23 may be formed by cylindrically winding up a sheet-like perforated plate such as an expanded metal, a punched metal, a metal lath, a plain weave wire mesh, or a Dutch weave wire mesh. The filter 23 is disposed between the igniter 22 and the first gas discharge ports 2114 and the second gas discharge ports 2115 in a state where the upper end part is supported by the top plate part 2111 of the upper shell 211 and the lower end part is supported by the bottom plate part 2121 of the lower shell 212. Due to this, a combustion chamber 25 is formed between the igniter 22 and the filter 23. The combustion chamber 25 is filled with the first gas generating agent 24 combusted by the operation of the igniter 22. The first gas generating agent 24 is ignited by the combustion gas of the second gas generating agent 224 burned by the operation of the igniter 22, and generates a combustion gas or the like. The filter 23 is configured to allow the combustion gas to pass therethrough, and the combustion gas in the combustion chamber is cooled by passing through the filter 23, and the filter 23 filters the combustion gas by filtering combustion residues of the combustion gas.

Airbag Bag Body

The airbag bag body 3 is a bag-shaped member that inflates in a substantially spherical shape, for example, by containing the combustion gas discharged from the gas generator 2 therein. FIG. 1 schematically illustrates the airbag bag body 3 in a folded state before inflation. The airbag bag body 3 includes a gas inflow port 31 opened in a circular shape, for example, in a lower part, and a plurality of attachment holes 32 are formed at a peripheral edge of the gas inflow port 31. For example, a bolt 62 is inserted into the attachment hole 32, and the airbag bag body 3 is connected to the base plate 6 by the bolt 62. Note that a bolt hole 63 is formed in a peripheral edge part of the holding hole 61 of the base plate 6. That is, the airbag bag body 3 is connected to the gas generator 2 via the base plate 6. The gas discharge ports (the first gas discharge port 2114 and the second gas discharge port 2115) of the gas generator 2 are opened toward the inside of the airbag bag body 3. In other words, the airbag bag body 3 is disposed in communication with the inside of the gas generator 2 via the first gas discharge port 2114 and the second gas discharge port 2115 of the gas generator 2. The shielding member 4 and the elastic member 5 are accommodated between the airbag bag body 3 and the gas generator 2.

Shielding Member

The shielding member 4 is a bottomed tubular member. That is, the shielding member 4 includes a tube bottom part 41 and a side peripheral part 42. The shielding member 4 is accommodated in the airbag bag body 3 and covers an upper part of the housing 21 of the gas generator 2. Specifically, the shielding member 4 covers the top plate part 2111 of the upper shell 211 and a part of the upper tube part 2112. Note that the inner diameter of the shielding member 4 is larger than the outer diameter of the upper shell 211 and thus a gap is formed between the upper shell 211 of the gas generator 2 and the shielding member 4. The shielding member 4 is connected to the housing 21 through the elastic member 5. The elastic member 5 is a member having elasticity such as a metal coil spring, for example. The elastic member 5 changeably holds the position of the shielding member 4 with respect to the gas generator 2. For example, the elastic member energizes the shielding member 4 by extending upward, which is a direction in which the airbag bag body 3 inflates, in a state where no external force is applied. The position of the shielding member 4 moves in the vertical direction according to the magnitude of the external force received by the shielding member 4.

Figure 2:
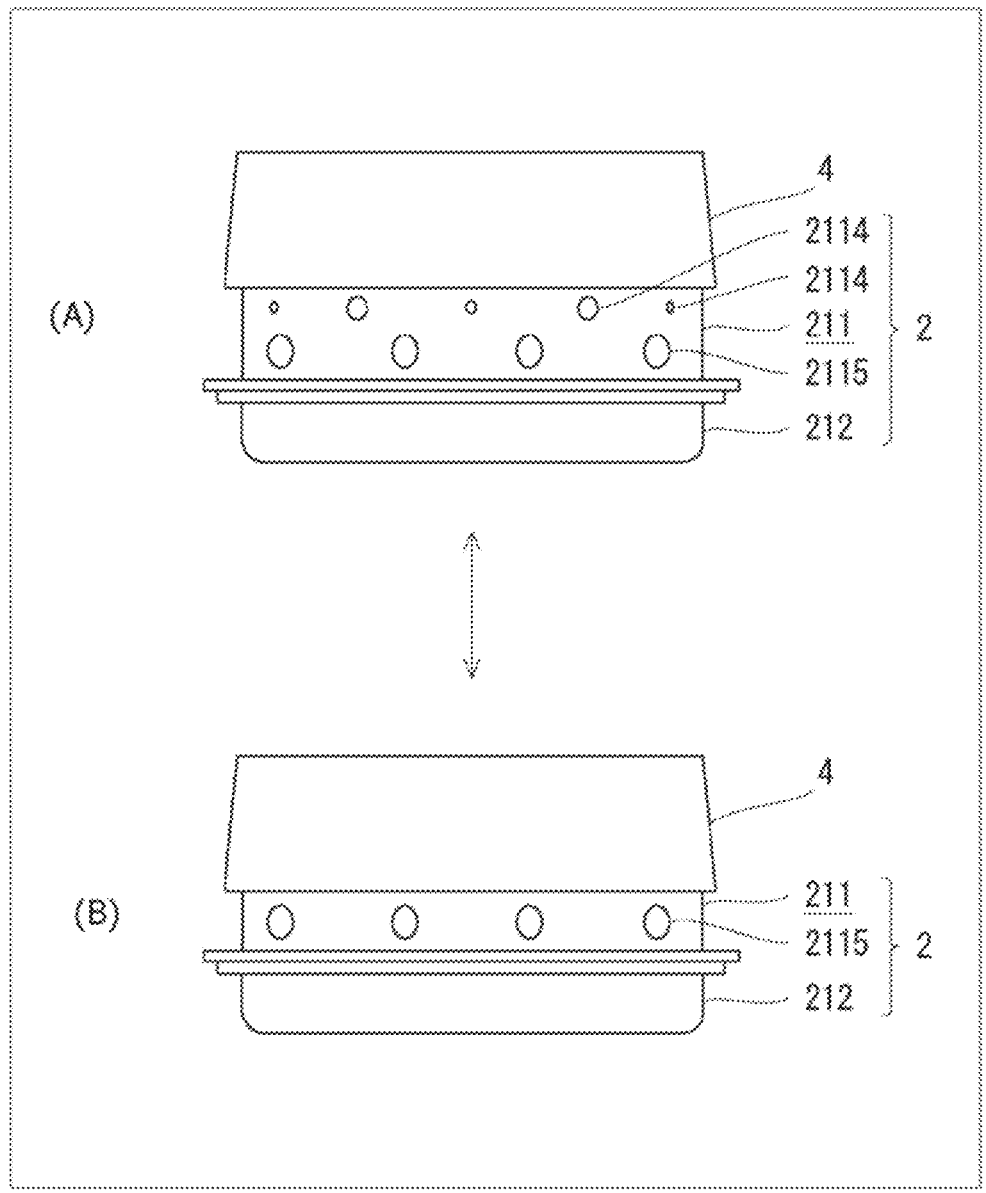
FIG. 2 is a view for describing a position of a shielding member.

During the operation of the airbag 1, the shielding member 4 can move to the shielding position located in the discharge direction of the combustion gas from the first gas discharge port 2114 and to the non-shielding position not located in the discharge direction of the combustion gas from the first gas discharge port 2114 according to the internal pressure of the airbag bag body 3. FIG. 2 is a view for describing the position of the shielding member 4. FIG. 2 only illustrates the housing 21 and the shielding member 4. (A) of FIG. 2 is a side view illustrating an example of the shielding member 4 located at the non-shielding position. (B) of FIG. 2 is a side view illustrating an example of the shielding member 4 located at the shielding position. The non-shielding position is a position where the shielding member 4 is pushed upward by the elastic member 5, and the shielding member 4 does not block the discharge direction of the combustion gas from the first gas discharge port 2114. In other words, at the non-shielding position, the inside of the shielding member 4 does not face the first gas discharge port. As illustrated in (A) of FIG. 2, the first gas discharge port 2114 is not covered with the shielding member 4 at the non-shielding position. The shielding position is a position where the shielding member 4 is pushed down by the internal pressure of the airbag bag body 3 and the shielding member 4 blocks the discharge direction of the combustion gas from the first gas discharge port 2114. In other words, at the shielding position, the inside of the shielding member 4 faces the first gas discharge port. As illustrated in (B) of FIG. 2, the first gas discharge port 2114 is covered with the shielding member 4 at the shielding position. Note that the vertical size of the shielding member 4 (side peripheral part 42) is a size in which the shielding member 4 is not positioned in the gas discharge direction from the second gas discharge port 2115 even in a state where the shielding member 4 is pushed downward to the lowest position. Also at the shielding position, since there is a gap between the gas generator 2 and the shielding member 4, the combustion gas discharged from the first gas discharge port 2114 collides with the shielding member 4 and then moves to the inside of the airbag bag body 3 through the inside of the shielding member 4. At this time, the temperature of the combustion gas is lowered by coming into contact with the shielding member 4. Note that the shielding member 4 preferably has high thermal conductivity. The material of the shielding member 4 may be a metal such as aluminum or copper, ceramic, graphite, or the like. Note that the inside of the shielding member 4 may have recesses and protrusions such as protrusions. By increasing the surface area of the shielding member 4, the area that can come into contact with the combustion gas increases, and the cooling effect can be enhanced. The shielding member 4 may include a filter. For example, the shielding member 4 may further include the filter 23 described above inside the side peripheral part 42, or the side peripheral part 42 may be formed of the same material as the filter 23. This improves cooling efficiency of the combustion gas.

Effects

In general, when the airbag inflates excessively at the time of a vehicle collision, the occupant may not be appropriately restrained and may receive an impact. On the other hand, even when the airbag inflates insufficiently, the occupant may not be appropriately restrained.

The internal pressure of the airbag changes according to the substance amount (number of moles) of the combustion gas discharged per unit time. For example, the reaction rate in combustion of the gas generating agent changes according to the environmental temperature at which the gas generator 2 is installed. That is, as the ambient temperature increases, the combustion speed of the gas generating agent also increases. A dual type gas generator (not illustrated) is provided with two combustion chambers accommodating an igniter and a gas generating agent, and can be operated in a mode in which only one is operated, a mode in which the two are simultaneously operated, or a mode in which the two are operated at different times. Such a difference in the operation mode also changes the physical quantity of the combustion gas discharged per unit time.

The shielding member 4 and the elastic member 5 are designed in a manner that when the internal pressure of the airbag bag body 3 exceeds a designed threshold, the shielding member 4 moves to the shielding position due to the pressure. When the shielding member 4 is located at the shielding position, the combustion gas discharged from the first gas discharge port 2114 collides with the shielding member 4, and the temperature thereof decreases. This makes it possible to suppress, to a small level, a difference in output of the gas generator 2 due to a difference in environmental temperature at the time of operation. That is, when the internal pressure of the airbag bag body 3 exceeds the predetermined threshold, the shielding member 4 moves to the shielding position to cool the combustion gas, thereby suppressing the pressure rise inside the airbag bag body 3. Consequently, excessive inflation of the airbag bag body 3 is suppressed. On the other hand, when the internal pressure of the airbag bag body 3 is equal to or less than the designed threshold, the shielding member 4 is positioned at the non-shielding position. At this time, the temperature of the combustion gas discharged into the airbag bag body 3 does not decrease. Thus, the shielding member 4 of the airbag 1 can suppress an occurrence of excessive inflation and insufficient inflation of the airbag bag body 3. Since the shielding member 4 is moved by the internal pressure of the airbag bag body 3, the airbag 1 does not require a complicated configuration for driving the shielding member 4. That is, the internal pressure of the airbag can be adjusted with a simple configuration.

Note that as illustrated in FIGS. 1 and 2, the second gas discharge ports 2115 may be larger in individual opening areas than the first gas discharge ports 2114. For example, when seal tapes having the same thickness are used to close the gas discharge port, the seal tape of the second gas discharge ports 2115, which has a large opening area, ruptures first. That is, the pressure required to rupture the seal tape closing the first gas discharge ports 2114 is higher than the pressure required to rupture the seal tape closing the second gas discharge ports 2115. In this manner, the second gas discharge ports 2115 open first, and the inflation of the airbag bag body 3 can be promptly started. For example, when the environmental temperature is high and the amount of combustion gas generated per unit time is relatively large, the first gas discharge ports 2114 are also continuously opened. Furthermore, when the internal pressure of the airbag bag body 3 rises beyond a predetermined standard, the combustion gas is cooled by the shielding member 4 moving to the shielding position by the pressure rise inside the airbag bag body 3, and further increase in the internal pressure of the airbag bag body 3 can be suppressed. On the other hand, when the amount of combustion gas generated per unit time is relatively small, the first gas discharge ports 2114 do not open until combustion is sufficiently advanced and the internal pressure of the gas generator 2 becomes sufficiently high. Even when the first gas discharge ports 2114 open, the shielding member 4 does not move to the shielding position when the pressure of the airbag bag body 3 is equal to or less than a predetermined value. Thus, the combustion gas is not excessively cooled.

If the top plate part 2111 is provided with the gas discharge port, the tube bottom part 41 of the shielding member 4 has a donut shape provided with one hole at the center part, and the combustion gas from the gas discharge port of the top plate part 2111 is discharged toward the center part. In this case, the combustion gas hardly collides with the shielding member when the shielding member 4 is in the non-shielding position (when the tube bottom part 41 is away from the top plate part 2111), and the combustion gas collides with the shielding member when the shielding member 4 is in the shielding position (when the tube bottom part 41 is at a position close to the top plate part 2111). On the other hand, as illustrated in FIG. 1, when the gas discharge port is provided only at the upper tube part 2112 and not provided at the top plate part 2111, in the configuration in which the shielding member 4 having a bottomed tubular shape covers the upper part of the upper shell 211, change in the position of the shielding member 4 in accordance with the internal pressure of the airbag bag body 3 can be easily controlled.

The shielding member 4 and the gas generator 2 may have similar shapes in plan view. In this manner, in the configuration in which the shielding member 4 is overlapped on the upper part of the gas generator 2, the entire airbag 1 can be downsized without creating wasted space.

Second Embodiment

Figure 3:
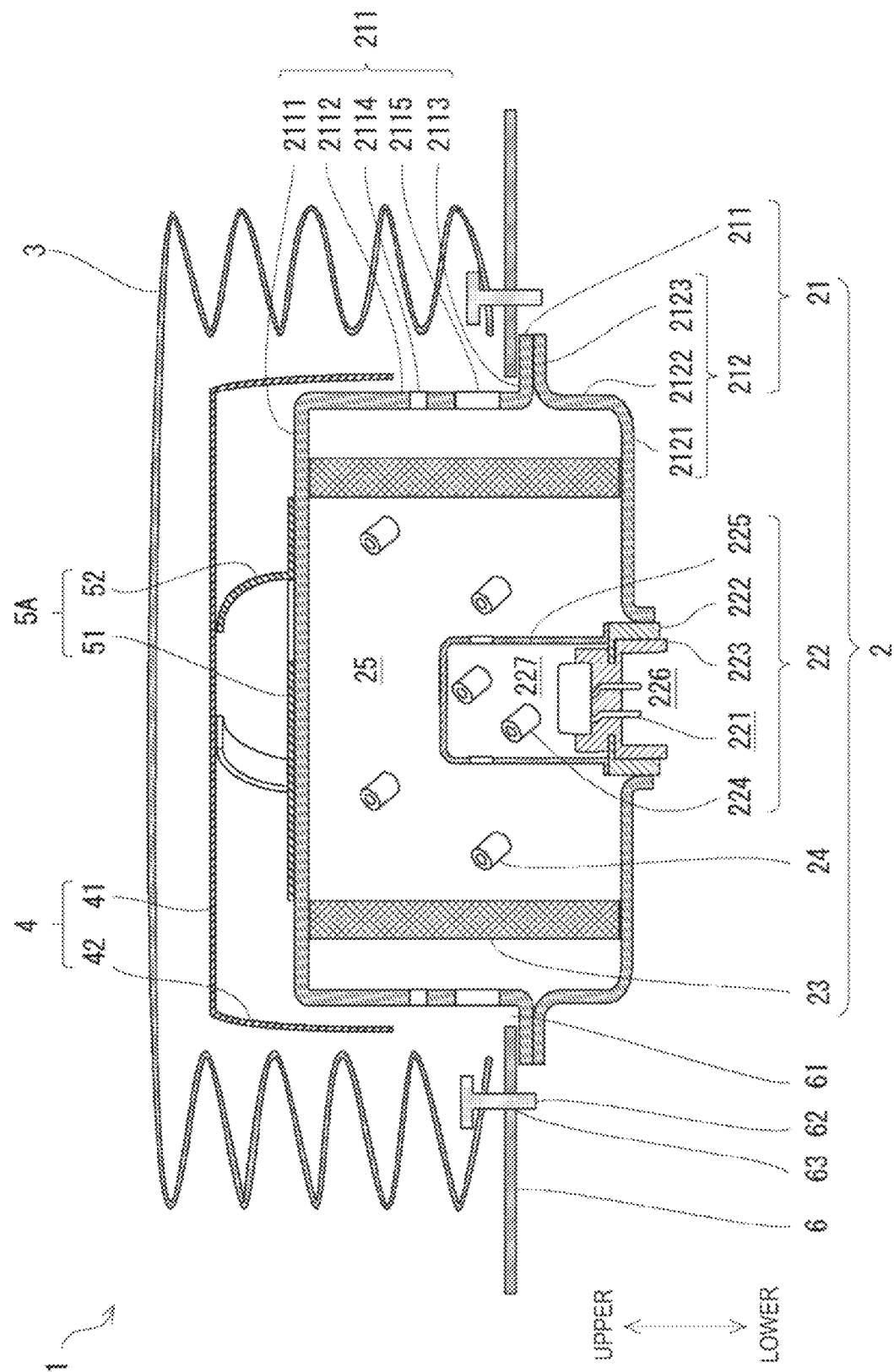
FIG. 3 is a schematic cross-sectional view illustrating an example of an airbag according to a second embodiment.
Figure 4:
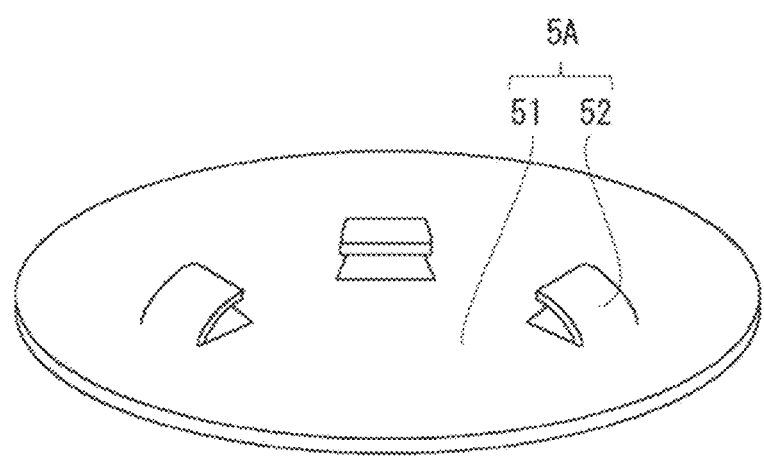
FIG. 4 is a perspective view illustrating an example of an elastic member.

FIG. 3 is a schematic cross-sectional view illustrating an example of the airbag according to the second embodiment. FIG. 4 is a perspective view illustrating an example of the elastic member. Note that in the present embodiment, constituent elements corresponding to the constituent elements in the above-described embodiment are denoted by the same reference signs, and description thereof is omitted.

An elastic member 5A according to the present embodiment includes a base part 51 having a flat plate shape and a plurality of leaf springs 52. The number of leaf springs is not particularly limited, and is, for example, three. The leaf spring 52 is formed, for example, by forming a substantially U-shaped slit in the metal base part 51 and raising upward a tongue piece part whose outer edge is defined by a slit. The raised tongue piece part may form a curved surface such as an arc in a longitudinal section, for example. The base part 51 may have a circular shape in plan view, for example. The base part 51 can be connected to the upper side of the gas generator 2 by welding or the like.

Also with the elastic member 5A, it is possible to energize the shielding member 4 and position the shielding member 4 at the shielding position or the non-shielding position according to the magnitude of the external force received by the shielding member 4.

Third Embodiment

Figure 5:
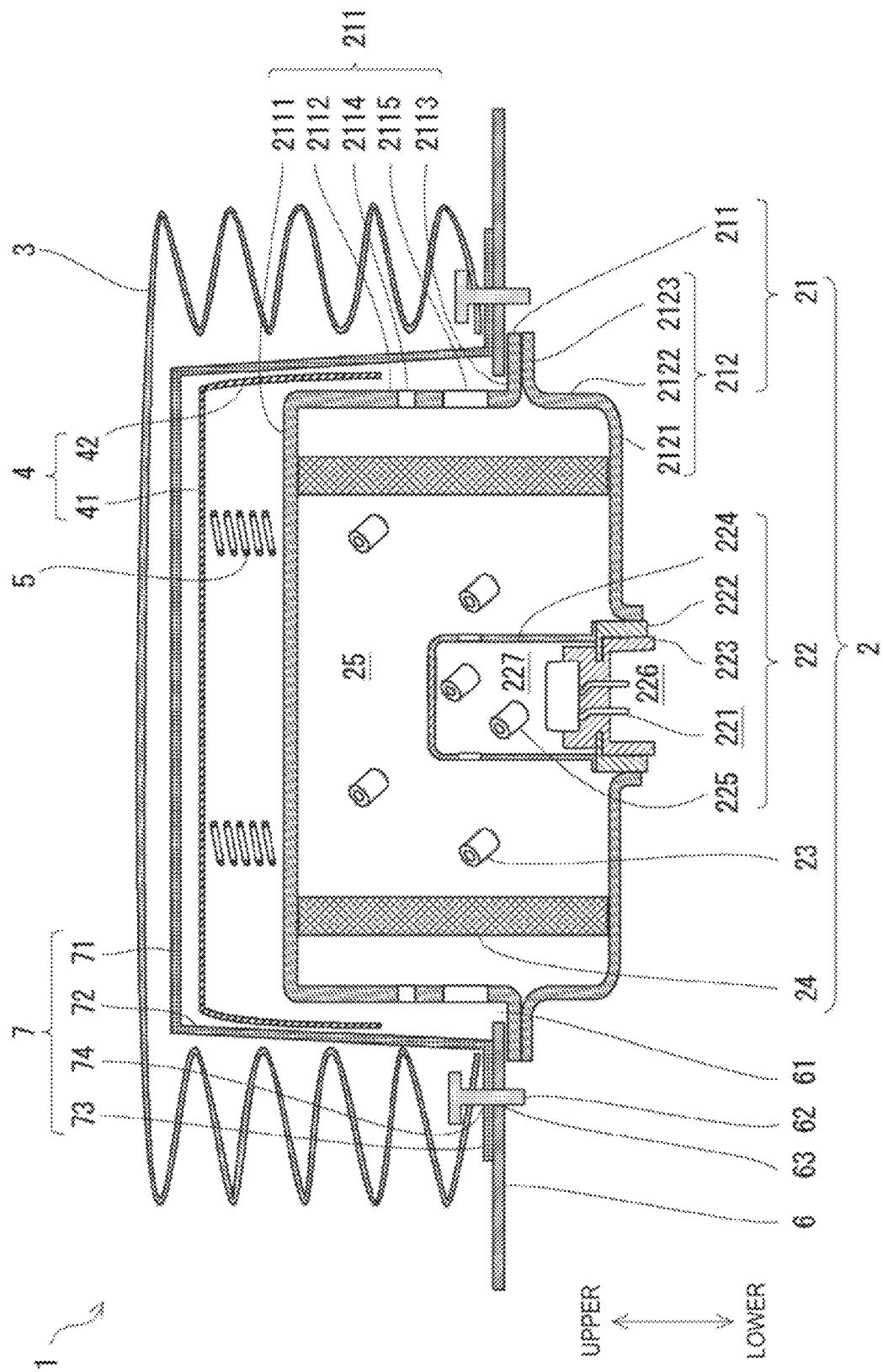
FIG. 5 is a schematic cross-sectional view illustrating an example of an airbag according to a third embodiment.

FIG. 5 is a schematic cross-sectional view illustrating an example of the airbag according to the third embodiment. Note that also in the present embodiment, constituent elements corresponding to the constituent elements in the above-described embodiments are denoted by the same reference signs, and description thereof is omitted.

In the example of FIG. 5, a perforated member 7 including a plurality of holes through which the combustion gas can pass is further included inside the airbag bag body 3 and outside the shielding member 4. The perforated member 7 is a bottomed tubular member, and includes a tube bottom part 71, a side peripheral part 72, and a flange part 73 provided at a lower end of the side peripheral part 72 and extending radially outward. The side peripheral part 72 has a circular shape in plan view (not illustrated), for example, and the diameter of the side peripheral part 72 is larger than the diameter of the side peripheral part 42 of the shielding member 4. The flange part 73 is provided with an attachment hole 74, which is a through hole, at a position corresponding to the bolt hole 63 of the base plate 6. For example, the bolt 62 is inserted into the attachment hole 74, and the perforated member 7 is fixed to the base plate 6 together with the airbag bag body 3 by the bolt 62. The plurality of holes are provided at least in the tube bottom part 71 and the side peripheral part 72, and the combustion gas generated by the gas generator 2 passes through the holes provided in the side peripheral part 72 and is discharged into the airbag bag body 3. The pressure of the gas inside and outside the perforated member 7 is substantially the same, and when the internal pressure of the airbag bag body 3 increases, the shielding member 4 is pushed downward.

The height of the side peripheral part 72 of the perforated member 7 does not hinder the movement of the shielding member 4 to the non-shielding position. For example, when the shielding member 4 is at the non-shielding position, the distance from the first gas discharge port 2114 to the tube bottom part 71 of the perforated member 7 is larger than the height of the side peripheral part 42 of the shielding member 4. Thus, in a state where the shielding member 4 is in contact with the inside of the tube bottom part 71 of the perforated member 7, the side peripheral part 42 of the shielding member 4 does not face the first gas discharge port 2114. The height of the side peripheral part 42 of the shielding member 4 is larger than the distance from the top plate part 2111 of the upper shell 211 to the tube bottom part 71 of the perforated member 7. Thus, the side peripheral part 42 of the shielding member 4 is not detached from between the upper tube part 2112 of the upper shell 211 of the gas generator 2 and the side peripheral part 72 of the perforated member 7. The side peripheral part 42 of the shielding member 4 is guided along between the upper tube part 2112 of the upper shell 211 of the gas generator 2 and the side peripheral part 72 of the perforated member 7, and moves to the shielding position and the non-shielding position. As described above, the perforated member 7 is disposed with the side peripheral part 42 of the shielding member 4 interposed between the perforated member 7 and the gas generator 2, and functions as a guide portion that guides the moving direction of the shielding member 4 and regulates the moving range of the shielding member 4. Even in a state where the airbag bag body 3 is folded before the airbag 1 is operated, the shielding member 4 does not interfere with the airbag bag body 3. Thus, before the airbag 1 is operated, the shielding member 4 can maintain the non-shielding position. When the airbag 1 is in operation, the combustion gas can be smoothly supplied into the airbag bag body 3, and the airbag bag body 3 can be quickly deployed.

Fourth Embodiment

Figure 6:
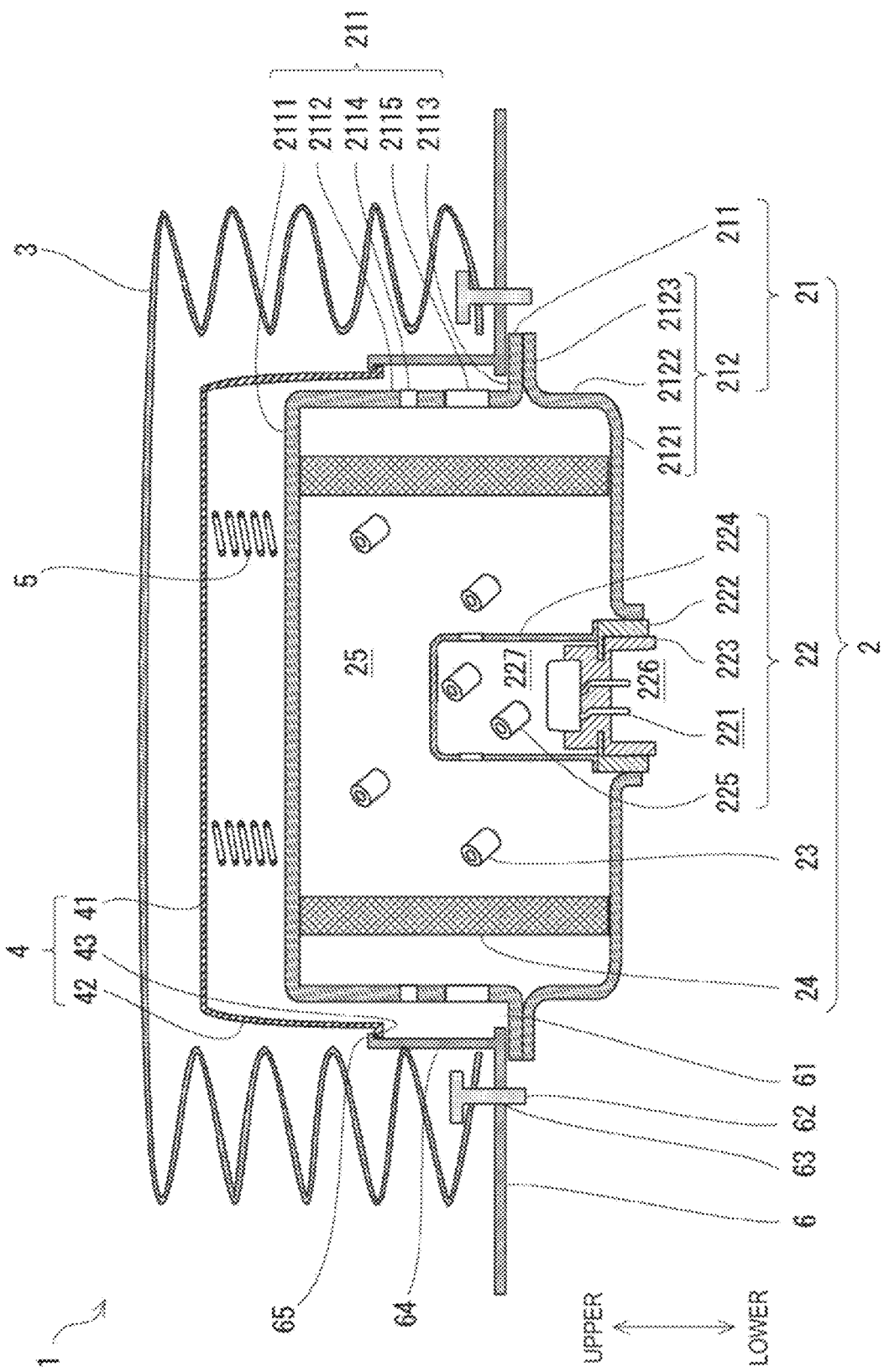
FIG. 6 is a schematic cross-sectional view illustrating an example of an airbag according to a fourth embodiment.
Figure 7:
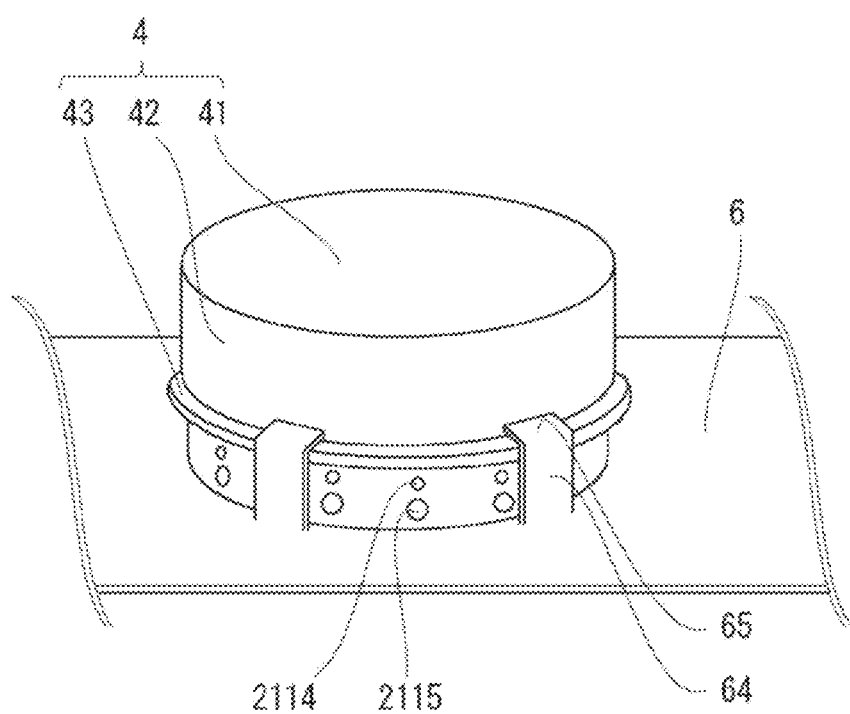
FIG. 7 is a perspective view illustrating an example of a base plate, a gas generator, and the shielding member.

FIG. 6 is a schematic cross-sectional view illustrating an example of the airbag according to the fourth embodiment. FIG. 7 is a perspective view illustrating an example of the base plate, the gas generator, and the shielding member. Note that also in the present embodiment, constituent elements corresponding to the constituent elements in the above-described embodiments are denoted by the same reference signs, and description thereof is omitted.

In the present embodiment, the shielding member 4 is provided at the lower end part of the side peripheral part 42 and has a flange part 43 protruding radially outward. The base plate 6 includes, at a peripheral edge part of the holding hole 61, a support part 64 extending upward and a hook 65 provided at a tip end of the support part 64 and protruding radially inward of the holding hole 61. The support part 64 may be connected to the base plate 6 by welding or the like. In the present embodiment, the flange part 43 and the hook 65 are engaged in a state where the shielding member 4 does not receive an external force of equal to or greater than a predetermined magnitude directed downward, and the shielding member 4 is not detached from the gas generator 2 and the base plate 6.

The support part 64 and the hook 65 according to the present embodiment are also disposed with the side peripheral part 42 of the shielding member 4 interposed between the support part 64 and the hook 65 and the gas generator 2, and function as a guide portion that guides the moving direction of the shielding member 4 and regulates the moving range of the shielding member 4.

Fifth Embodiment

Figure 8:
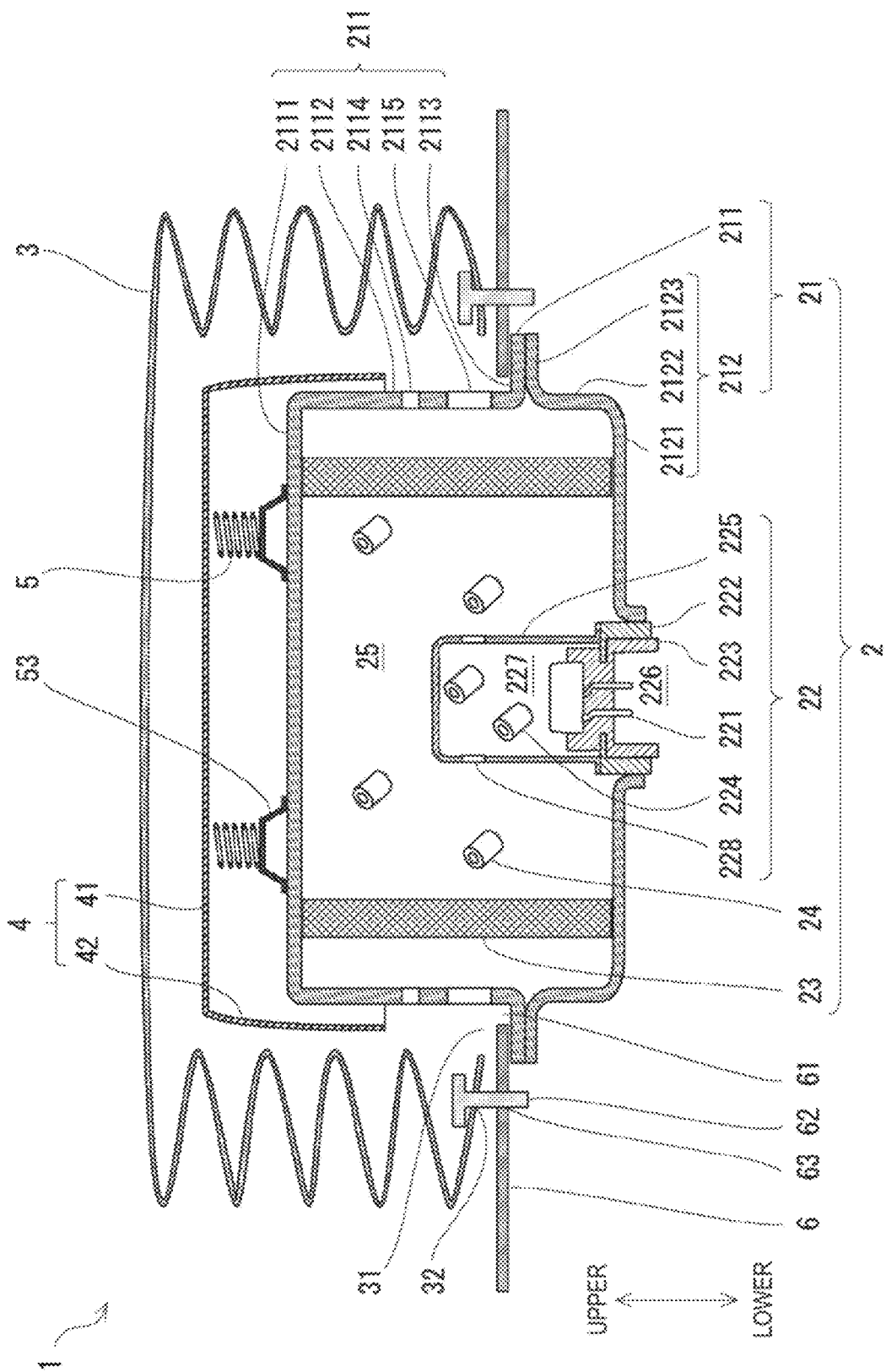
FIG. 8 is a schematic cross-sectional view illustrating an example of an airbag according to a fifth embodiment.
Figure 9:
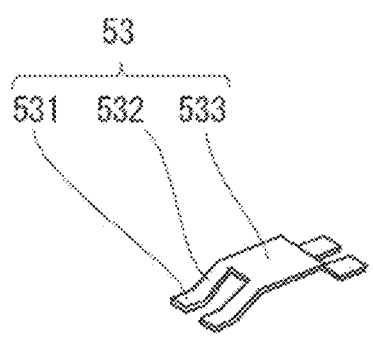
FIG. 9 is a perspective view illustrating an example of a pedestal.

FIG. 8 is a schematic cross-sectional view illustrating an example of the airbag according to the fifth embodiment. FIG. 9 is a perspective view illustrating an example of the pedestal. Note that also in the present embodiment, constituent elements corresponding to the constituent elements in the above-described embodiments are denoted by the same reference signs, and description thereof is omitted.

In the present embodiment, the elastic member 5, which is a coil spring, is connected to the gas generator 2 via a pedestal 53. As illustrated in FIG. 9, the pedestal 53 has a connection part 531 connected to the gas generator 2, for example, by welding, a leg part 532 rising obliquely upward, and a flat part 533 connected to the elastic member 5. The connection part 531 and the leg part 532 are formed at each of the four corners of the rectangular flat part 533. For example, the elastic member 5 may be a resin coil spring, and one side of the elastic member 5 may be fixed to the flat part 533 using a screw or the like. The other side of the elastic members 5 may be fixed to the shielding member 4 using a screw or the like.

In general, when the gas generator 2 is in operation, heat stored in the internal filter 23 is transferred to the housing 21. In the present embodiment, a gap is provided between the elastic member 5 and the gas generator 2 by the pedestal 53, and heat is hardly transferred to the elastic member 5. The material of the elastic member 5 may be a silicon resin or a polyimide resin having predetermined heat resistance.

Sixth Embodiment

Figure 10:
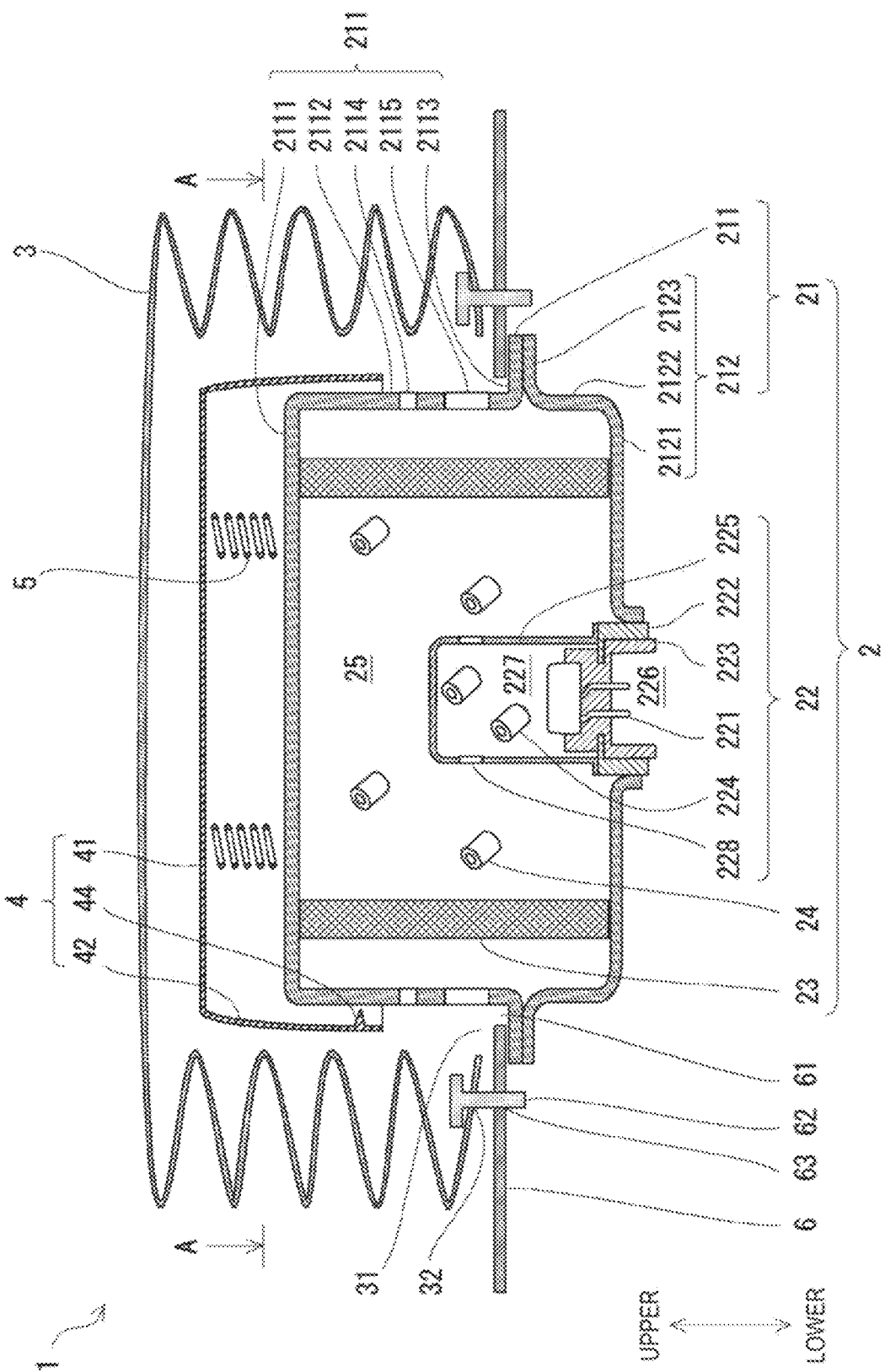
FIG. 10 is a schematic cross-sectional view illustrating an example of an airbag according to a sixth embodiment.
Figure 11:
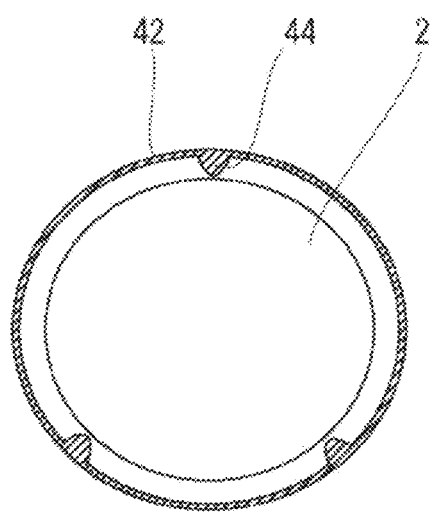
FIG. 11 is a cross-sectional view of the gas generator and the shielding member taken along line A-A in FIG. 10.

FIG. 10 is a schematic cross-sectional view illustrating an example of the airbag according to the sixth embodiment. FIG. 11 is a cross-sectional view of the gas generator and the shielding member taken along line A-A in FIG. 10. Note that also in the present embodiment, constituent elements corresponding to the constituent elements in the above-described embodiments are denoted by the same reference signs, and description thereof is omitted.

In the present embodiment, the side peripheral part 42 of the shielding member 4 includes a spacer portion 44 protruding inward. The spacer portion 44 is provided in a part in the circumferential direction. In the example of FIG. 11, three spacer portions 44 are provided at equal intervals in the circumferential direction, but the number and positions of the spacer portions 44 are not limited to those of the illustrated example. A gap is formed between the spacer portions 44 along the inner periphery of the side peripheral part 42, and a flow path of the combustion gas is formed between the shielding member 4 and the gas generator 2. The spacer portion 44 protrudes toward the side surface of the gas generator 2, but needs not be in contact with the side surface of the gas generator 2. The spacer portion 44 may be formed by deforming the side peripheral part 42 of the shielding member 4 from the outside toward the inside. By providing three or more spacer portions 44, for example, at substantially equal intervals, bias in the cross-sectional shape of the flow path of the combustion gas is eliminated, and when the airbag 1 is operated, and the shielding member 4 moves to the shielding position, bias in the amount of the combustion gas discharged from between the gas generator 2 and the shielding member 4 to the surroundings is eliminated, and the airbag bag body 3 evenly inflates around it. Note that instead of the shielding member 4, the gas generator 2 may be provided with the spacer portion that protrudes outward.

Seventh Embodiment

Figure 12:
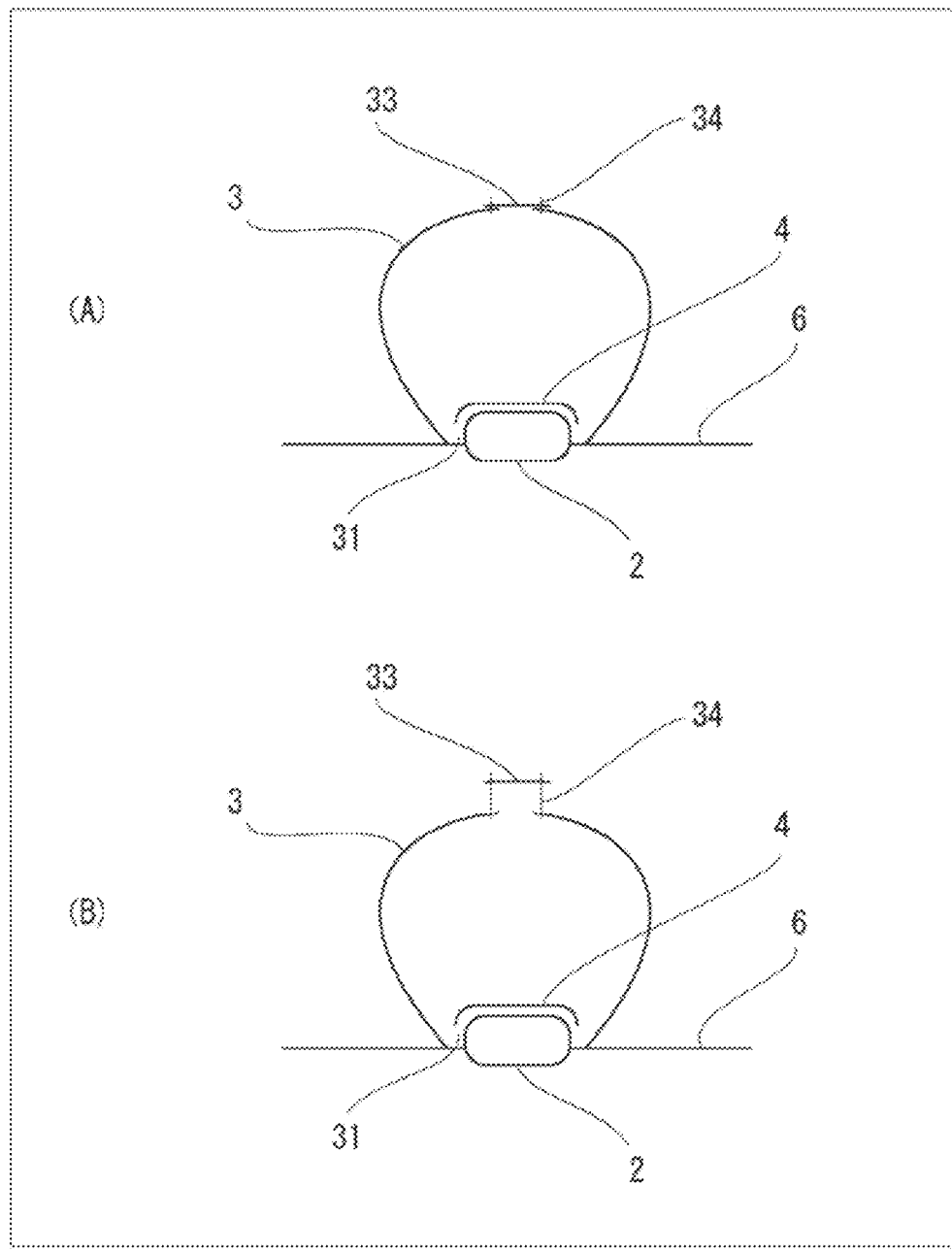
FIG. 12 is a view for describing an operation of the airbag according to a seventh embodiment at the time of inflation.

FIG. 12 is a view for describing the operation of the airbag according to the seventh embodiment at the time of inflation.

Note that also in the present embodiment, constituent elements corresponding to the constituent elements in the above-described embodiments are denoted by the same reference signs, and description thereof is omitted.

The airbag bag body 3 according to the present embodiment includes a variable vent openable and closable by the internal pressure of the airbag bag body 3 on the side opposite to the gas inflow port 31. The variable vent covers an exhaust port opened in the airbag bag body 3 with a closing member 33. The closing member 33 is connected to the airbag bag body 3 by a suture member such as a stretchable thread. (A) of FIG. 12 illustrates a state where the internal pressure of the airbag bag body 3 is equal to or less than a predetermined threshold. In (A) of FIG. 12, the closing member 33 of the variable vent closes the exhaust port. (B) of FIG. 12 illustrates a state where the internal pressure of the airbag bag body 3 exceeds the predetermined threshold. In (B) of FIG. 12, a suture member 34 is extended by the internal pressure of the airbag bag body 3, and the exhaust port is opened. Also with such the variable vent, the internal pressure of the airbag 1 can be further adjusted. Note that in general, the airbag bag body 3 is provided with a vent hole (not illustrated) for gradually discharging the internal combustion gas. In the present embodiment, in addition to such the vent hole, the variable vent is provided in the airbag bag body 3.

Eighth Embodiment

Figure 13:
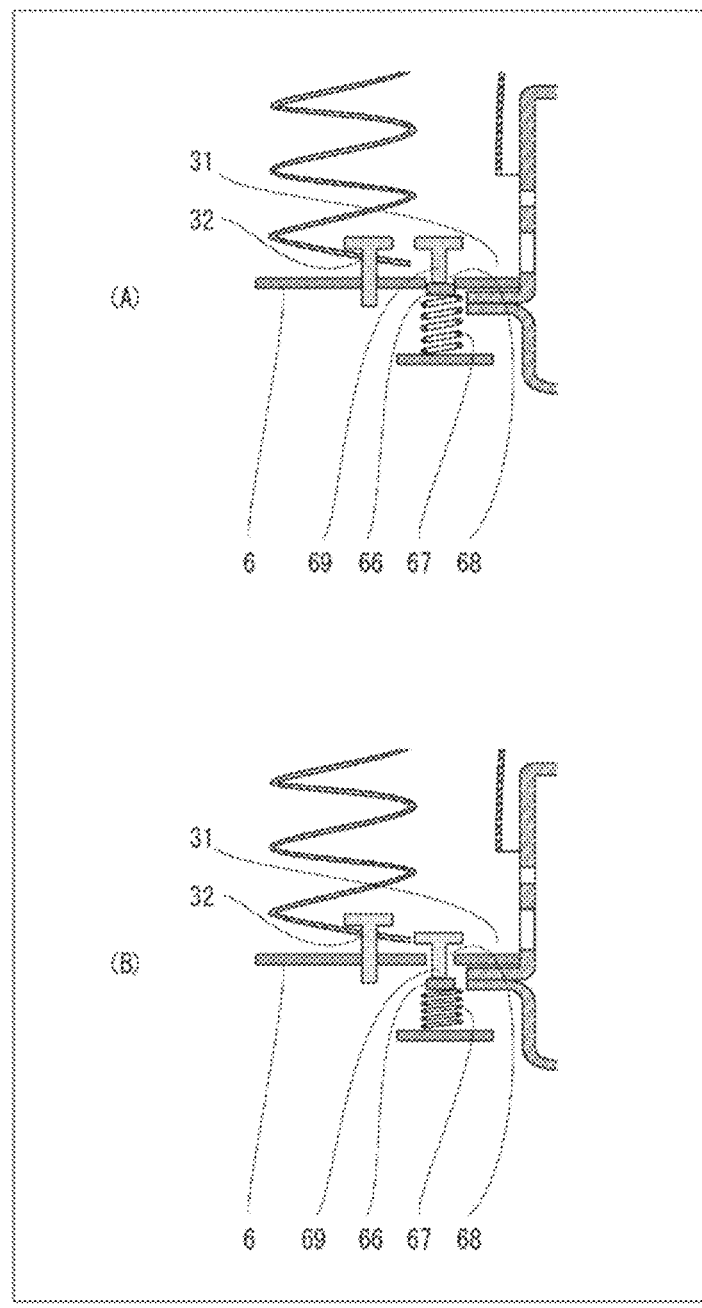
FIG. 13 is a view for describing an operation of the airbag according to an eighth embodiment at the time of inflation.

FIG. 13 is a view for describing the operation of the airbag according to the eighth embodiment at the time of inflation. Note that also in the present embodiment, constituent elements corresponding to the constituent elements in the above-described embodiments are denoted by the same reference signs, and description thereof is omitted.

The base plate 6 according to the present embodiment includes a variable vent openable and closable by the internal pressure of the airbag bag body 3. The variable vent according to the present embodiment includes an exhaust port 68 provided at the base plate 6, a rubber packing 66 energized by a coil spring 67 or the like from below the base plate 6, and a movable member 69 connected to the upper part of the rubber packing 66. The movable member 69 is disposed in a manner that the exhaust port 68 penetrates in the vertical direction, and the movable range of the rubber packing 66 is limited in the vertical direction. (A) of FIG. 13 illustrates a state where the internal pressure of the airbag bag body 3 is equal to or less than a predetermined threshold. In FIG. 13(A), the rubber packing 66 biased by the coil spring 67 of the variable vent closes the exhaust port 68. (B) of FIG. 13 illustrates a state where the internal pressure of the airbag bag body 3 exceeds the predetermined threshold. In (B) of FIG. 13, the rubber packing 66 is pushed down against the coil spring 67 by the internal pressure of the airbag bag body 3, and the exhaust port 68 is opened. Also with such the variable vent, the internal pressure of the airbag 1 can be adjusted.

Other

Although embodiments of an igniter assembly and the gas generator according to the present disclosure have been described above, each aspect disclosed in the present description can be combined with other features disclosed in the present description. For example, at least one of the guide portions described in the third and fourth embodiments, the spacer portion described in the sixth embodiment, and the variable vents described in the seventh and eighth embodiments can be combined with the shielding member and the elastic member described in the first, second, or fifth embodiment.

REFERENCE SIGNS LIST

1: Airbag
2: Gas generator
21: Housing
211: Upper shell
2114: First gas discharge port
2115: Second gas discharge port
212: Lower shell
22: Igniter
23: Filter
24: First gas generating agent
25: Combustion chamber
3: Airbag bag body
31: Gas inflow port
32: Attachment hole
33, 34: Variable vent
4: Shielding member
41: Tube bottom part
42: Side peripheral part
43: Flange part
44: Spacer portion
5, 5A: Elastic member
51: Base part
53: Pedestal
531: Connection part
532: Leg part
533: Flat part
6: Base plate
61: Holding hole
62: Bolt
63: Bolt hole
64: Support part
65: Hook
66 to 69: Variable vent
7: Perforated member
71: Tube bottom part
72: Side peripheral part
73: Flange part
74: Attachment hole

The invention claimed is:

1. An airbag device, comprising:
a gas generator including
   an ignition device,
   a gas generating agent ignited by the ignition device and generating a combustion gas, and
   a housing accommodating the ignition device and the gas generating agent and provided with a gas discharge port;
a shielding member covering an outside of the housing and configured to move to a shielding position located in a discharge direction of the combustion gas from the gas discharge port and to a non-shielding position not located in the discharge direction of the combustion gas from the gas discharge port;
an elastic member disposed between the housing and the shielding member and configured to energize the shielding member to position the shielding member at the shielding position or the non-shielding position in accordance with a magnitude of an external force received by the shielding member; and
an airbag bag body disposed in communication with an inside of the housing through the gas discharge port of the gas generator, the airbag bag body accommodating the shielding member and the elastic member.

2. The airbag device according to claim 1, wherein the elastic member extends in a state where the shielding member does not receive an external force, to position the shielding member at the non-shielding position.

3. The airbag device according to claim 1, wherein the housing includes an upper surface, a bottom surface, and a side surface, the side surface connecting the upper surface and the bottom surface and being provided with a plurality of the gas discharge ports,
the shielding member includes an upper part covering the upper surface of the housing, and a peripheral wall part extending from a peripheral edge of the upper part toward the bottom surface, and
the shielding member blocks a discharge direction of the combustion gas from at least some of the plurality of gas discharge ports at the shielding position.

4. The airbag device according to claim 3, wherein the peripheral wall part of the shielding member includes a filter.

5. The airbag device according to claim 3, wherein the plurality of gas discharge ports include,
a first gas discharge port provided on a side near the upper surface on the side surface and
a second gas discharge port provided on a side near the bottom surface relative to the first gas discharge port on the side surface, and
the shielding member faces the first gas discharge port at the shielding position, and does not face the first gas discharge port at the non-shielding position.

6. The airbag device according to claim 5, wherein each of the plurality of gas discharge ports is closed by a closing member, and
a pressure needed to rupture a closing member closing the first gas discharge port is higher than a pressure needed to rupture a closing member closing the second gas discharge port.

7. The airbag device according to claim 3, wherein the upper surface of the shielding member has a flat plate shape without a hole.

8. The airbag device according to claim 3, wherein the upper surface of the shielding member has a shape similar to a shape of the upper surface of the gas generator.

9. The airbag device according to claim 8, wherein in plan view, the shielding member has a circular shape larger than the gas generator, and the shielding member or the gas generator includes a spacer portion forming a gap between the shielding member and the gas generator.

10. The airbag device according to claim 1, further comprising:
a guide portion provided to sandwich the shielding member between the guide portion and the gas generator, and configured to guide a moving direction of the shielding member and regulate a moving range of the shielding member.

11. The airbag device according to claim 10, wherein the guide portion is a perforated member provided between the shielding member and the airbag bag body and including a plurality of holes through which the combustion gas passes.

12. The airbag device according to claim 1, further comprising:
a base plate connected to the gas generator and an airbag bag body, wherein at least one of the airbag bag body or a base plate includes a variable vent openable and closable in accordance with an internal pressure of the airbag bag body, the variable vent discharging a part of the combustion gas when an internal pressure of the airbag bag body exceeds a predetermined threshold.

13. A gas generator, comprising:
an igniter;
a gas generating agent ignited by the igniter and generating a combustion gas;
a housing accommodating the igniter and the gas generating agent and provided with a gas discharge port;
a shield covering an outside of the housing and configured to move to a shielding position where the shield faces the gas discharge port and to a non-shielding position where the shield does not face the gas discharge port; and
an elastic substance disposed between the housing and the shield and configured to energize the shield to position the shield at the shielding position or the non-shielding position.

14. The gas generator according to claim 13, wherein the housing includes,
an upper surface,
a bottom surface, and
a side surface connecting the upper surface and the bottom surface and being provided with a plurality of the gas discharge ports,
the shield includes an upper part covering the upper surface of the housing, and a peripheral wall part extending from a peripheral edge of the upper part toward the bottom surface, and
the shield blocks a discharge direction of the combustion gas from at least some of the plurality of gas discharge ports at the shielding position.

15. The gas generator according to claim 14, wherein the peripheral wall part of the shield includes a filter.

16. The gas generator according to claim 14, wherein the plurality of gas discharge ports include,
a first gas discharge port provided on a side near the upper surface on the side surface and
a second gas discharge port provided on a side near the bottom surface relative to the first gas discharge port on the side surface, and
the shield faces the first gas discharge port at the shielding position, and does not face the first gas discharge port at the non-shielding position.

17. The gas generator according to claim 13, wherein the clastic substance is provided on the upper surface of the housing and includes a leaf spring or a coil spring.

* * * * *

UNITED STATES PATENT AND TRADEMARK OFFICE
CERTIFICATE OF CORRECTION

PATENT NO. : 12,330,579 B2
APPLICATION NO. : 18/585235
DATED : June 17, 2025
INVENTOR(S) : Kenji Fukumoto Page 1 of 1

It is certified that error appears in the above-identified patent and that said Letters Patent is hereby corrected as shown below:

In the Claims

Claim 17, Column 16, Line 56, "clastic substance" should read --elastic substance--.

Signed and Sealed this
Twenty-third Day of September, 2025

John A. Squires
*Director of the United States Patent and Trademark Office*